US011567321B2

(12) United States Patent
Chen (10) Patent No.: US 11,567,321 B2
(45) Date of Patent: Jan. 31, 2023

(54) DISTORTION CALIBRATION GLASSES, DISTORTION CORRECTION HEAD-UP DISPLAY DEVICE AND SYSTEM, IMAGE DISPLAY DISTORTION CORRECTION METHOD AND IN-VEHICLE SYSTEM (71) Applicant: BOE TECHNOLOGY GROUP CO., LTD., Beijing (CN)

(72) Inventor: Yanjun Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 869 days.

(21) Appl. No.: 16/295,136

(22) Filed: Mar. 7, 2019

(65) Prior Publication Data

US 2019/0369398 A1 Dec. 5, 2019

(30) Foreign Application Priority Data

May 30, 2018 (CN) .......................... 201810538218.0

(51) Int. Cl.
*G02B 27/01* (2006.01)
*G02B 27/14* (2006.01)
*G09G 3/00* (2006.01)
*G06F 3/01* (2006.01)
*B60R 11/02* (2006.01)
(Continued)

(52) U.S. Cl.
CPC ...... *G02B 27/0172* (2013.01); *B60R 11/0229* (2013.01); *G02B 5/3025* (2013.01); *G06T 5/006* (2013.01); *B60R 2300/205* (2013.01); *G02B 2027/011* (2013.01); *G02B 2027/014* (2013.01);
(Continued)

(58) Field of Classification Search
CPC ... G06F 3/016; G02B 27/0103; G02B 27/145; G02B 27/0172; G02B 27/0149; G02B 27/0101; B60T 8/172; G09G 3/003
See application file for complete search history.

(56) References Cited

U.S. PATENT DOCUMENTS 10,996,481 B1 * 5/2021 Wells ..................... B60K 35/00
2016/0091715 A1   3/2016 Larson et al.

FOREIGN PATENT DOCUMENTS

| CN | 105467590 A     |   | 4/2016  |              |
|----|-----------------|---|---------|--------------|
| DE | 102017100676 A1 | * | 7/2018  | G02B 27/0101 |
| WO | 2008052730 A1   |   | 5/2008  |              |

OTHER PUBLICATIONS

First Chinese Office Action dated Apr. 1, 2020, received for corresponding Chinese Application No. 201810538218.0, 21 pages.

* cited by examiner

*Primary Examiner* — Dawayne Pinkney
(74) *Attorney, Agent, or Firm* — Kinney & Lange, P.A.

(57) ABSTRACT

Glasses, a head-up display device and system, and an in-vehicle system for distortion calibration are provided, as well as a distortion correction method. The glasses include a first lens, a second lens, and a correction structure. The correction structure includes first and second standard plates and a polarizers having first and second polarization directions corresponding to the first and second lenses, respectively. The first and second standard plates are configured to enable the head-up display device to generate first and second correction images after receiving first and second distortion images of the first and second standard plates, respectively, based on the first and second distortion degrees of the first and second standard plates, respectively, and on an image to be displayed. The first polarized direction is perpendicular to the second polarized direction.

14 Claims, 4 Drawing Sheets (51) Int. Cl.
 *G02B 5/30* (2006.01)
 *G06T 5/00* (2006.01)
(52) U.S. Cl.
 CPC ............... *G02B 2027/0114* (2013.01); *G02B 2027/0178* (2013.01)

DISTORTION CALIBRATION GLASSES, DISTORTION CORRECTION HEAD-UP DISPLAY DEVICE AND SYSTEM, IMAGE DISPLAY DISTORTION CORRECTION METHOD AND IN-VEHICLE SYSTEM

CROSS REFERENCE OF RELATED APPLICATION

The present application claims priority to Chinese patent application No. 201810538218.0 filed on May 30, 2018, which is incorporated herein by reference in its entirety.

TECHNICAL FIELD

The present disclosure relates to the field of in-vehicle electronic devices, and more specifically to distortion calibration glasses, a distortion correction head-up display device, and system, an image display distortion correction method, and an in-vehicle system.

BACKGROUND

Head-Up Displays (HUD) result in an image distortion due to optical systems and windshields being off-axis. This distortion can be corrected statically by an image source before leaving the factory. However, when a driver's head movement during actual driving cause eyeglass position to change, projection distortion can also change, causing the distortion compensation set at the factory to sometimes be inappropriate. In addition, due to the windshield manufacturing and installation accuracy error and in-vehicle system vibration, the HUD internal optical component position error can also introduce the distortion which needs to be corrected in a timely fashion.

SUMMARY

A human eye distortion calibration glasses for a head-up display device is provided in the present disclosure, including: a first lens, a second lens and a correction structure, where
  the correction structure includes a first standard plate and a first polarizer having a first polarization direction corresponding to the first lens, and a second standard plate and a second polarizer having a second polarization direction corresponding to the second lens;
  the first standard plate is configured to enable the head-up display device to generate a first correction image after receiving a first distortion image of the first standard plate and based on a first distortion degree of the first standard plate and an image to be displayed, and the second standard plate is configured to enable the head-up display device to generate a second correction image after receiving a second distortion image of the second standard plate and based on a second distortion degree of the second standard plate and the image to be displayed;
  the first polarized direction is perpendicular to the second polarized direction.

Optionally, the first distortion degree is determined based on an original image and the first distortion image of the first standard plate, and the second distortion degree is determined based on an original image and the second distortion image of the second standard plate.

Optionally, the calibration structure is configured to enable the first correction image and the second correction image to transmit alternately to left and right eyes of a user at a predetermined time interval.

Optionally, the human eye distortion calibration glasses further includes a first dichroic mirror corresponding to the first standard plate and a second dichroic mirror corresponding to the second standard plate;
  the first dichroic mirror is configured to enable light emitted by the head-up display device and reflected by the first dichroic mirror to transmit to the first standard plate, and reflect an image reflected by the first standard plate to the head-up display device, where the first correction image generated by the head-up display device passes through the first dichroic mirror and transmits to a left eye of a user;
  the second dichroic mirror is configured to enable light emitted by the head-up display device and reflected by the second dichroic mirror to transmit to the second standard plate, and reflect an image reflected by the second standard plate to the head-up display device, where the second correction image generated by the head-up display device passes through the second dichroic mirror and transmits to a right eye of the user.

Optionally, original images of the first standard plate and the second standard plate each includes square structures arranged in an array.

A distortion correction head-up display device is further provided in the present disclosure, including an image generation circuit, an optical path circuit, and a control circuit, where
  the control circuit is configured to generate a first distortion calibration signal and a second distortion calibration signal respectively based on a first distortion degree and a second distortion degree which are predetermined or acquired through a preprocessing;
  the image generation circuit is configured to receive the first distortion calibration signal and generate a first correction image subjected to a distortion correction and receive the second distortion calibration signal and generate a second correction image subjected to a distortion correction;
  the optical path circuit includes a third polarizer, where the third polarizer is configured to adjust a polarization direction to a first polarization direction or a second polarization direction based on a predetermined condition, where the first polarization direction is perpendicular to the second polarization direction, to enable the head-up display device to output light of the first correction image polarized at the first polarization direction or light of the second correction image polarized at the second polarization direction.

Optionally, the third polarizer is configured to adjust the polarization direction to the first polarization direction and the second polarization direction alternately at a first predetermined time interval, to generate the first correction image and the second correction image alternately at the first predetermined time interval.

Optionally, the distortion correction head-up display device further includes an image acquisition circuit configured to acquire distortion images of original images and output the distortion images to the control circuit, to enable the first and the second distortion calibration signal to have distortion degrees relative to the original images.

Optionally, the first distortion degree is determined based on an original image and a first distortion image of a first standard plate, and the second distortion degree is determined based on an original image and a second distortion image of a second standard plate.

Optionally, the image generation circuit is further configured to generate calibration signal light, or the device further includes a light source configured to emit calibration signal light;

the image generation circuit or the light source is configured to transmit the calibration signal light to the first standard plate and the second standard plate, to obtain a first distortion image of the first standard plate and a second distortion image of the second standard plate;

the control circuit is configured to generate the first distortion calibration signal based on the first distortion image and the original image of the first standard plate and generate the second distortion calibration signal based on the second distortion image and the original image of the second standard plate, and the image generation circuit is configured to generate the first correction image and second correction image respectively based on the first distortion calibration signal and the second distortion calibration signal.

Optionally, the calibration signal light and the first correction image are alternately generated at a second predetermined time interval, or the calibration signal light and the second correction image are alternately generated at the second predetermined time interval.

Optionally, the optical path circuit further includes a third dichroic mirror configured to reflect images reflected by the first and the second standard plates to an image acquisition circuit, where the images pass through the optical path circuit and form distortion images.

A distortion correction head-up display system is further provided in the present disclosure, including a head-up display device and a distortion calibration glasses, where the distortion calibration glasses includes a first lens, a second lens and a correction structure, where     the correction structure includes a first standard plate and a first polarizer having a first polarization direction corresponding to the first lens, and a second standard plate and a second polarizer having a second polarization direction corresponding to the second lens, the first polarized direction is perpendicular to the second polarized direction;

the head-up display device includes an image generation circuit, an optical path circuit, and a control circuit, where     the control circuit is configured to generate a first distortion calibration signal and a second distortion calibration signal respectively based on a first distortion degree and a second distortion degree which are predetermined or acquired through a preprocessing;

the image generation circuit is configured to receive the first distortion calibration signal and generate a first correction image subjected to a distortion correction and receive the second distortion calibration signal and generate a second correction image subjected to a distortion correction;

the optical path circuit includes a third polarizer, where the third polarizer is configured to adjust a polarization direction to a first polarization direction or a second polarization direction based on a predetermined condition, to enable the head-up display device to output light of the first correction image polarized at the first polarization direction or light of the second correction image polarized at the second polarization direction.

Optionally, the third polarizer is configured to adjust the polarization direction to the first polarization direction and the second polarization direction alternately at a first predetermined time interval, to generate the first correction image and the second correction image alternately at the first predetermined time interval.

Optionally, the correction structure includes a first standard plate corresponding to the first lens and a second standard plate corresponding to the second lens;

the image generation circuit is further configured to generate calibration signal light, or the device further includes a light source configured to emit calibration signal light;

the image generation circuit or the light source is configured to transmit the calibration signal light to the first standard plate and the second standard plate, to obtain a first distortion image of the first standard plate and a second distortion image of the second standard plate;

the control circuit is configured to generate the first distortion calibration signal based on the first distortion image and the original image of the first standard plate and generate the second distortion calibration signal based on the second distortion image and the original image of the second standard plate, and the image generation circuit is configured to generate the first correction image and second correction image respectively based on the first distortion calibration signal and the second distortion calibration signal.

Optionally, the calibration signal light and the first correction image or the second correction image are generated alternately at a second predetermined time interval; and/or the first correction image and the second correction image are generated alternately at the second time interval.

An image display distortion correction method applying the distortion correction head-up display system hereinabove is further provided in the present disclosure, including:

at a first time period, receiving, by the image generation circuit, a first distortion calibration signal sent by the control circuit, to generate a first correction image subjected to a distortion correction;

adjusting, by the third polarizer, a polarization direction to a first polarization direction, to enable the head-up display device to output light of the first correction image polarized at the first polarization direction; and     transmitting, by the first polarizer, the light of the first correction image polarized at the first polarization direction to a left eye of a user;

at a second time period, receiving, by the image generation circuit, a second distortion calibration signal sent by the control circuit, to generate a second correction image subjected to a distortion correction;

adjusting, by the third polarizer, the polarization direction to a second polarization direction, to enable the head-up display device to output light of the second correction image polarized at the second polarization direction; and     transmitting, by the second polarizer, the light of the second correction image polarized at the second polarization direction to a right eye of the user.

Optionally, the distortion correction head-up display device further includes an image acquisition circuit, where prior to the receiving, by the image generation circuit, the first distortion calibration signal sent by the control circuit, to generate the first correction image subjected to the distortion correction, the method further includes:

generating calibration signal light by the image acquisition circuit or a light source, to generate a first distortion image of the first standard plate;

acquiring the first distortion image of the first standard plate and transmitting the first distortion image to the control circuit by the image acquisition circuit, to enable the control circuit to determine a first distortion degree;

prior to the receiving, by the image generation circuit, the second distortion calibration signal sent by the control circuit, to generate the second correction image subjected to the distortion correction, the method further includes:

generating calibration signal light by the image acquisition circuit or the light source, to generate a second distortion image of the second standard plate;

acquiring the second distortion image of the second standard plate and transmitting the second distortion image to the control circuit by the image acquisition circuit, to enable the control circuit to determine a second distortion degree.

A vehicle-mounted system including the distortion correction head-up display system hereinabove is further provided.

The present summary is provided only by way of example, and not limitation. Other aspects of the present disclosure will be appreciated in view of the entirety of the present disclosure, including the entire text, claims, and accompanying figures.

BRIEF DESCRIPTION OF THE DRAWINGS

The embodiments of the present disclosure will be further described in detail below in conjunction with the drawings.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

In order to explain the present disclosure more clearly, the present disclosure will be further described in conjunction with the embodiments and the drawings. Similar components in the drawings are denoted by the same reference numerals. It should be understood by those skilled in the art that the following detailed description is intended to be illustrative only.

Figure 1:
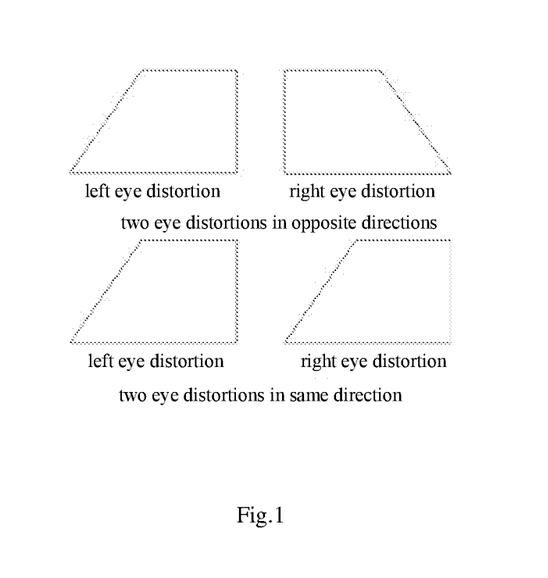
FIG. 1 is a schematic view of a distortion principle in some embodiments of the present disclosure.

In the relate art, the image correction technique for the heads-up display is to correct the entire image, so the left and right eyes cannot be distinguished, resulting in that the correction is only effective for one of the eyes, while the other eye may be subjected to a distortion accumulation, so the correction effect is poor. As shown in FIG. 1, since the left and right eyes are located at different positions relative to the window, the distortions of the left and right eyes are different. When the distortions of the two eyes are in the same direction, if the distortion of any eye is corrected, and the distortion of the other eye is also reduced. When the distortions of the two eyes are in opposite directions, when the distortion of one eye is corrected, the distortion of the other eye may be increased.

In view of this, in order to balance the distortions of two eyes, the present disclosure improves the head-up display device and the glasses matched thereto, and the present disclosure will be described in detail below with reference to FIGS. 2-5.

Figure 2:
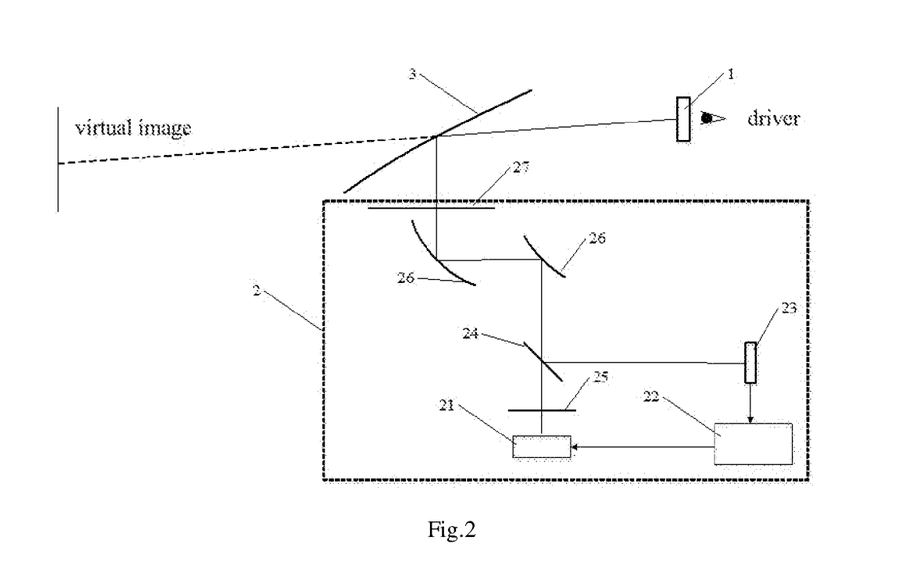
FIG. 2 is a schematic view of a distortion correction head-up display device in some embodiments of the present disclosure.

FIG. 2 is a schematic view of a distortion correction head-up display device in some embodiments of the present disclosure. The distortion correction head-up display device includes a head-up display device 2 and a glasses 1. The correction image generated by the head-up display device 2 passes through the windshield and passes through the glass cover 27 of the device, and then the correction image is reflected by the windshield 3 outside the device to the user or the driver's eye, so that the driver may see the image projected onto the windshield 3. The image passes the glass cover 27 and the windshield 3, so the optical path thereof may cause distortions of different degrees for the left and right eyes respectively.

Figure 4:
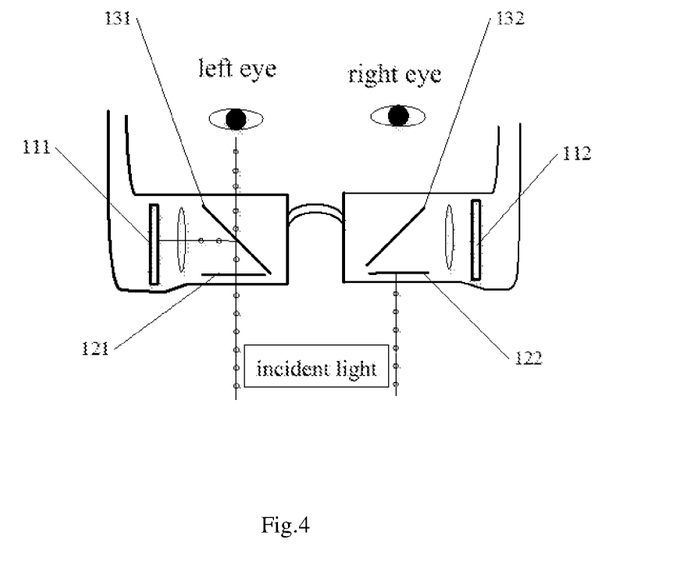
FIG. 4 is a schematic view of a distortion calibration glasses in some embodiments of the present disclosure.
Figure 5:
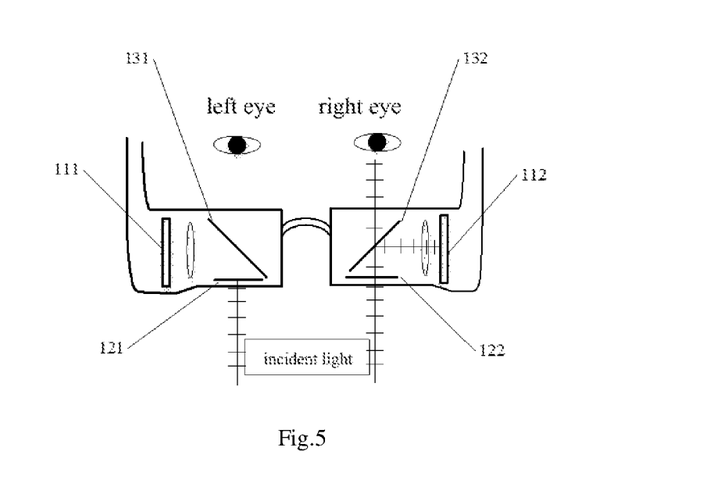
FIG. 5 is a schematic view of a distortion calibration glasses in some embodiments of the present disclosure.

In some embodiments of the present disclosure, as shown in FIGS. 4 and 5, the glasses 1 includes a first lens corresponding to a user or a driver's left eye, a second lens corresponding to a user or a driver's right eye, and a correction structure disposed on the glasses 1. The correction structure includes a first polarizer 121 having a first polarization direction corresponding to the first lens and a second polarizer 122 having a second polarization direction corresponding to the second lens.

The polarization direction of the first polarizer 121 may be perpendicular to the first lens, and a polarization direction of the second polarizer 122 may be parallel to the second lens, the disclosure is not limited thereto, and the polarization directions may be other directions as long as the polarization direction of the first polarizer 121 is perpendicular to that of the second polarizer 122, so that when one of the eyes (for example, the left eye) receives the correction image (first correction image), the other eye (right eye) is completely shielded from receiving the correction image (first correction image), so as to avoid mutual interference and vice versa. It is known in the art that the polarization direction of the polarizer can be adjusted by rotating the polarizer, the detailed description thereof is omitted herein.

Since the polarization direction of the first polarizer 121 is perpendicular to that of the second polarizer 122, at the same time, the image generated by the head-up display device 2 may only pass through one polarizer, and the head-up display device 2 may generate two different correction images respectively for the left and right eyes in a time-sharing manner. Taking the first correction image and the second correction image for example, the first correction image has a vibration direction as same as the polarization direction of the first polarizer 121. In some embodiments of the present disclosure, the vibration direction of the first image may be perpendicular to a vibration direction of the first lens. When the head-up display device 2 outputs the first correction image, sine the polarization direction of the second polarizer 122 is perpendicular to the vibration direction of the first correction image, so the first correction image is shielded by the second polarizer 122, the right eye cannot acquire the first correction image. On the contrary, the left eye cannot acquire the second correction image. The output image of the head-up display device 2 is alternately switched by means of time division multiplexing.

Referring to FIG. 2, the head-up display device 2 includes: an image generation circuit 21, an optical path circuit and a control circuit 22. The control circuit 22 is configured to generate a first distortion calibration signal and a second distortion calibration signal respectively based on a first distortion degree and a second distortion degree which are predetermined.

In some embodiments of the present disclosure, the predetermined distortion degree may be a pre-stored distortion degree, including a first distortion degree adjusted to the system for the left eye and a second distortion degree adjusted to the system for the right eye. The first distortion degree and the second distortion degree may be fixed values, or may be switched to a plurality of variable values by a predetermined trigger condition. For example, when the trigger condition is that the user or the driver adjusts the seat to a certain extent, the switch is performed, and at this time, the system has a plurality of built in different assignments, and corresponds the assignments to specific scenario, thereby being able to adapt to different scenarios.

The image generation circuit 21 is configured to receive the first distortion calibration signal and generate a first correction image subjected to a distortion correction and receive the second distortion calibration signal and generate a second correction image subjected to a distortion correction. The optical path circuit includes an adjustable third polarizer 25. Since the first polarizer and the second polarizer are not adjustable, the third polarizer is configured to adjust the polarization direction to be, for example, a polarization direction perpendicular to the first lens or a direction polarization parallel to the second lens based on a predetermined condition, so that the head-up display device 2 may output the first correction image of which the vibration direction is the same as the polarization direction of the first polarizer and the second correction image of which the vibration direction is the same as the polarization direction of the second polarizer image.

According to some embodiments of the present disclosure, by respectively generating two correction images for the left eye and the right eye, it is able to solve the distortion accumulation of one eye caused by the single correction image which failing to balance both eyes, thereby improving the correction effect and accuracy of the distortion. In addition, by the polarization control, the two correction images can be entered into the corresponding eyes respectively in a time-division manner, so the generated correction images may not be affected by each other.

Figure 7:
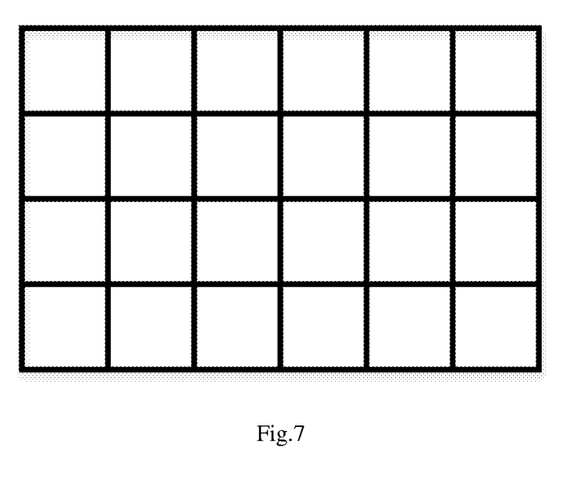
FIG. 7 is a schematic view of original images of a first standard plate and a second standard plate in some embodiments of the present disclosure.

It is well known in the art that the optical path of the image, the setting, the specification, the positional error of the internal components of the windshield 3 of the automobile, and even the vibration of the automobile may cause the distortion degree to change, so the fixed and single predetermined distortion degree often does not work. Even though the predetermined assignments corresponding to different scenes are applied, it is impossible to cover all scenes, and the accuracy is not guaranteed. Therefore, in some embodiments of the present disclosure, the distortion degree is obtained by a preprocessing. The distortion degree acquired by the preprocessing is different from the predetermined distortion degree, which may be the distortion degree acquired in real time according to a specific scenario. For this embodiment, the algorithm involved and the scene processing is more complicated, which generally requires a more complicated processor for calculation processing. In some embodiments of the present disclosure, a specific pre-processing acquisition method is provided. In some embodiments of the present disclosure, the correction structure further includes a first standard plate 111 corresponding to the first lens and a second standard plate 112 corresponding to the second lens. FIG. 7 is a schematic view of original images of a first standard plate and a second standard plate. The image generation circuit 21 is configured to transmit the calibration signal light to the first standard plate 111 and the second standard plate 112, to obtain a first distortion image of the first standard plate 111 and a second distortion image of the second standard plate 112. The control circuit 22 is configured to generate the first distortion calibration signal based on the first distortion image and the original image of the first standard plate 111 and generate the second distortion calibration signal based on the second distortion image and the original image of the second standard plate 112. The image generation circuit 21 is configured to generate the first correction image and second correction image respectively based on the first distortion calibration signal and the second distortion calibration signal.

Figure 3:
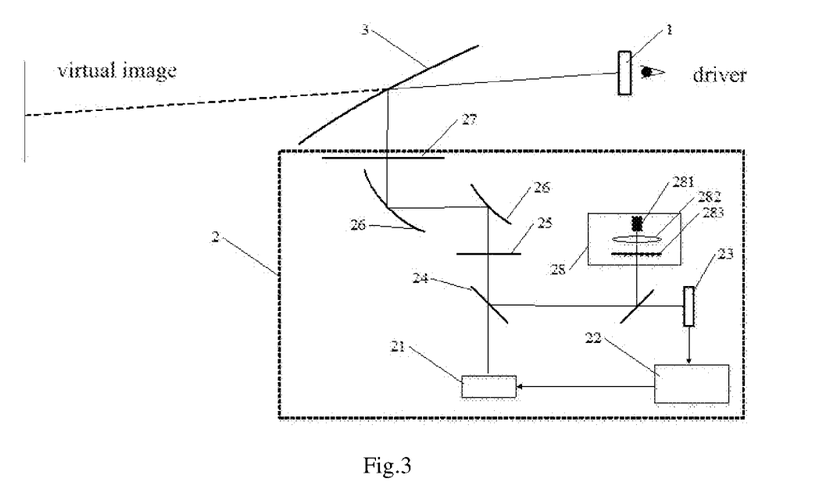
FIG. 3 is a schematic view of a distortion correction head-up display device in some embodiments of the present disclosure.

Optionally, a light source may also be applied. As shown in FIG. 3, the light source 28 includes a point source 281, a beam expander 282 and a micro lens array 283 for generating calibration signal light, such as a near-infrared source.

The original image of the first standard plate 111 and the original image of the second standard plate 112 may be the same or different. In some embodiments of the present disclosure, the original image of the first standard plate 111 and the original image of the second standard plate 112 are the same, so as to avoid lowering distortion correction accuracy. Optionally, original images of the first standard plate and the second standard plate each includes square structures arranged in an array.

Optionally, the head-up display device 2 further includes an image acquisition circuit 23, such as a camera or the like, configured to acquire distortion images of the first standard plate and the second standard plate.

In some embodiments of the present disclosure, the original images of the first standard plate and the second standard plate may be pre-stored in the storage medium in the system. Since the distortion image is acquired through the standard plate, the standard plate is arranged in the glasses 1, therefore, the optical path of the receiving standard distortion image thereof is the same or substantially the same as the optical path of the image from the head-up display device 2 into the human eye, thereby avoiding the influence of different optical paths. In addition, the calibration signal light is transmitted in real time, and the correction image is obtained according to the previous distortion calibration signal, so even if the user or the driver adjusts position, steering or other windshield 3, etc., and then causes the distortion, the accuracy of the distortion degree will not be affected.

In some embodiments of the present disclosure, the calibration signal light is invisible near-infrared monochromatic light, such that even if the calibration signal light enters into the human eyes, the human eyes may not perceive it, thereby avoiding interference with the human eyes.

Of course, in order to completely avoid mutual interference between the visible image light and the calibration signal light, the circuit or the human eyes that need visible image light only receives the visible image light, and the circuit that needs the calibrate signal light only receives the calibration signal light, and a dichroic mirror may be arranged on the optical path where the system is located, where the dichroic mirror can transmit the visible image light and reflect the calibration signal light, so as to avoid the mutual interference between the visible image light and the calibration signal light.

Specifically, the glasses 1 further includes a first dichroic mirror 131 corresponding to the first standard plate and a second dichroic mirror 132 corresponding to the second standard plate. The first dichroic mirror 131 is configured to enable light emitted by the head-up display device 2 and reflected by the first dichroic mirror to transmit to the first standard plate, and reflect an image reflected by the first standard plate to the head-up display device 2, where the first correction image generated by the head-up display device 2 passes through the first dichroic mirror 131 and transmits to a left eye of a user. The second dichroic mirror 132 is configured to enable light emitted by the head-up display device 2 and reflected by the second dichroic mirror to transmit to the second standard plate, and reflect an image reflected by the second standard plate to the head-up display device 2, where the second correction image generated by the head-up display device 2 passes through the second dichroic mirror 132 and transmits to a right eye of the user. The dichroic mirrors enable the visible light to enter into the human eyes, and enable the invisible near-infrared light to irradiate on the standard plates, thereby avoiding the near-infrared light form entering into the human eyes and avoiding the visible light from enter from irradiating the standard plates.

In addition, since the human eyes can also reflect the reflected light of the human eye, the light entering into the camera includes the distortion image of the standard plate and the human eye image of, so the human eye image needs to be filtered. In some embodiments of the present disclosure, a third dichroic mirror 24 may be provided in the head-up display device 2, which transmits the human eye image (visible light), and reflects the distortion image of the standard plate (invisible near-infrared monochrome light) to the camera to avoid the effects of visible light. The image reflected by the standard plate passes through the optical path circuit and forms a distortion image.

The dichroic mirror may be set according to the band distribution of the image generation circuit 21. For example, the band distribution of the visible light image is R650 nm, G550 nm, B450 nm, and near-infrared 700 nm. The short-wavelength transmittance of visible light is set to 100% by a coating (actually 98%), and the transflectivity of long-wave band of near-infrared is set to 50:50, 90:10, 10:90, etc., as needed.

Of course, in some embodiments of the present disclosure, according to the arrangement of the optical path, a plurality of reflective mirrors 26 which can change the optical path may be provided, so that the optical path may be optimally adjusted according to the space and structure of the head-up display device 2.

Optionally, the first correction image and the second correction image are alternately generated at a predetermined time interval, so as to avoid the discomfort of the human eye caused by different time intervals, or avoid affecting the distortion accuracy fora single human eye.

Optionally, the calibration signal light and the correction image are alternately generated at a first predetermined time interval, and the calibration signal light is firstly transmitted by the image generation circuit, so that the generation of the correction image of the next frame is based on the distortion calibration signal of the previous frame.

Optionally, the calibration signal light and the first correction image or the second correction image are alternately generated at a second predetermined time interval. Optionally, the first correction image and the second correction image are alternately generated at the second time interval. That is, the calibration signal light, the first correction image, the calibration signal light, and the second correction image are respectively generated in a time-division multiplexing manner. For example, according to the human eye physiological dynamic recognition capability, the image refresh rate per second is greater than 60 Hz, and the refresh rate of the image generation circuit may be set to be greater than 240 Hz. A and B segments are set in the time-division multiplexing. Wherein, A and B respectively represent a left eye control time period and a right eye control time period (the first time period and the second time period); A0 and B0 respectively represent a left eye near-infrared standard plate image acquisition time period and a right eye near-infrared standard plate image acquisition time period. A1 and B1 respectively represent a left eye correction image light output time period and a right eye correction image light output time period. The time-sharing ratio can be set to $T(A):T(B)=1:1$, $T(A1) \gg T(A0)$ (for example, $T(A1):T(A0)=9:1$), $T(A0)=T(B0)$, $T(A1)=T(B1)$.

According to the above embodiments, the human eye distortion calibration glasses for a head-up display device includes a first lens, a second lens and a correction structure, where the correction structure includes a first standard plate and a first polarizer having a first polarization direction corresponding to the first lens, and a second standard plate and a second polarizer having a second polarization direction corresponding to the second lens. The first standard plate is configured to enable the head-up display device to generate a first correction image after receiving a first distortion image of the first standard plate and based on a first distortion degree of the first standard plate and an image to be displayed, and the second standard plate is configured to enable the head-up display device to generate a second correction image after receiving a second distortion image of the second standard plate and based on a second distortion degree of the second standard plate and the image to be displayed. The first polarized direction is perpendicular to the second polarized direction. Therefore, when one of the eyes corresponding to the first correction image receives the first correction image, another eye corresponding to the second correction image is shielded, and when one of the eyes corresponding to the second correction image receives the second correction image, another eye corresponding to the first correction image is shielded.

The glasses may cooperate with the head-up display device that outputs the first correction image and the second correction image, the detailed description thereof is omitted herein.

A distortion correction head-up display device is further provided in some embodiments of the present disclosure, including an image generation circuit, an optical path circuit, and a control circuit, where the control circuit is configured to generate a first distortion calibration signal and a second distortion calibration signal respectively based on a first distortion degree and a second distortion degree which are predetermined or acquired through a preprocessing. The image generation circuit is configured to receive the first distortion calibration signal and generate a first correction image subjected to a distortion correction and receive the second distortion calibration signal and generate a second correction image subjected to a distortion correction. The optical path circuit includes a third polarizer, where the third polarizer is configured to adjust a polarization direction to a first polarization direction or a second polarization direction based on a predetermined condition, where the first polarization direction is perpendicular to the second polarization direction, to enable the head-up display device to output light of the first correction image polarized at the first polarization direction or light of the second correction image polarized at the second polarization direction.

Figure 6:
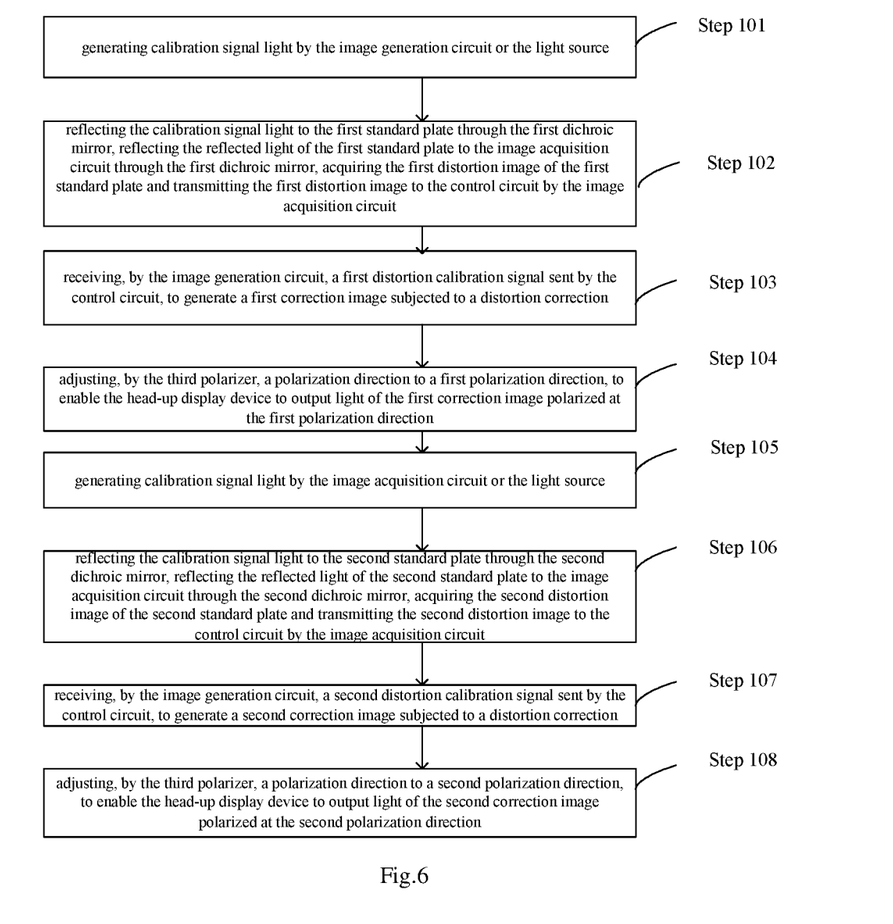
FIG. 6 is a flow chart of a distortion correction method in some embodiments of the present disclosure.

An image display distortion correction method applying the distortion correction head-up display system hereinabove is further provided in some embodiments of the present disclosure. Referring to FIG. 2, FIG. 4, FIG. 5 and FIG. 6, the head-up display device includes: an image generation circuit 21, an optical path circuit and a control circuit 22. The glasses 1 includes a first lens, a second lens and a correction structure. The correction structure includes a first standard plate 111 corresponding to the first lens and a first polarizer 121 having a first polarization direction, and a second standard plate 112 corresponding to the second lens and a second polarizer 122 having a second polarization direction. As shown in FIG. 6, the method includes the following steps:

In Step 101 of the first timing period, generating calibration signal light by the image generation circuit or the light source. The calibration signal light in this step may be near-infrared invisible monochromatic light (for example, having a wavelength of 700 nm). Correspondingly, the light source may be a near-infrared light source.

In Step 102, reflecting the calibration signal light to the first standard plate through the first dichroic mirror, reflecting the reflected light of the first standard plate to the image acquisition circuit through the first dichroic mirror, acquiring the first distortion image of the first standard plate and transmitting the first distortion image to the control circuit by the image acquisition circuit, to enable the control circuit to determine a first distortion degree.

The first dichroic mirror may be configured to transmit visible image light and reflect invisible near-infrared light through a coating process. In this step, the invisible near-infrared light irradiates on the first standard plate, and the reflected light of the first standard plate is collected by a collecting device such as a camera, and the collection optical path thereof is the same as or substantially the same as the optical path of emitting the image light, thereby avoiding affecting the optical path.

In Step 103, receiving, by the image generation circuit, a first distortion calibration signal sent by the control circuit, to generate a first correction image subjected to a distortion correction. The first distortion calibration signal is determined based on the acquired distortion image of the first standard plate and the original image of the first standard plate.

In Step 104, adjusting, by the third polarizer, a polarization direction to a first polarization direction, to enable the head-up display device to output light of the first correction image polarized at the first polarization direction. The third polarizer may change the polarization direction by a rotation, and the polarization direction may be adjusted to the first polarization direction, so that the first correction image passing through the third polarizer may only transmit the polarization light that vibrates in the first polarization direction.

According to the above steps, the first correction image may be transmitted to one of the eyes of the user (for example, the left eye) while the other eye (right eye) is shielded from receiving the image.

In Step 105 of the second timing period, generating calibration signal light by the image acquisition circuit or the light source, where the calibration signal light in this step is identical to that in Step 101.

In Step 106, reflecting the calibration signal light to the second standard plate through the second dichroic mirror, reflecting the reflected light of the second standard plate to the image acquisition circuit through the second dichroic mirror, acquiring the second distortion image of the second standard plate and transmitting the second distortion image to the control circuit by the image acquisition circuit, to enable the control circuit to determine a second distortion degree.

The second dichroic mirror may be configured to transmit visible image light and reflect invisible near-infrared light through a coating process. In this step, the invisible near-infrared light irradiates on the second standard plate, and the reflected light of the second standard plate is collected by a collecting device such as a camera, and the collection optical path thereof is the same as or substantially the same as the optical path of emitting the image light, thereby avoiding affecting the optical path.

In Step 107, receiving, by the image generation circuit, a second distortion calibration signal sent by the control circuit, to generate a second correction image subjected to a distortion correction. The second distortion calibration signal is determined based on the acquired distortion image of the second standard plate and the original image of the second standard plate.

In Step 108, adjusting, by the third polarizer, a polarization direction to a second polarization direction, to enable the head-up display device to output light of the second correction image polarized at the second polarization direction. The third polarizer may change the polarization direction by a rotation, and the polarization direction may be adjusted to the second polarization direction, so that the second correction image passing through the third polarizer may only transmit the polarization light that vibrates in the second polarization direction.

According to the above steps, the first correction image may be transmitted to one of the eyes of the user (for example, the right eye) while the other eye (left eye) is shielded from receiving the image.

For example, according to the human eye physiological dynamic recognition capability, the image refresh rate per second is greater than 60 Hz, and the refresh rate of the image generation circuit may be set to be greater than 240 Hz. A and B segments are set in the time-division multiplexing. Wherein, A and B respectively represent a left eye control time period and a right eye control time period (the first time period and the second time period); A0 and B0 respectively represent a left eye near-infrared standard plate image acquisition time period and a right eye near-infrared standard plate image acquisition time period. A1 and B1 respectively represent a left eye correction image light output time period and a right eye correction image light output time period. The time-sharing ratio can be set to T(A): T(B)=1:1, T(A1)>>T(A0) (for example, T(A1): T(A0) =9:1), T (A0)=T(B0), T(A1)=T(B1).

According to the above method, the correction images may be generated for the left eye and the right eye respectively in a time-division multiplexing manner, where the correction images are all determined based on the distortion degree determined by the distortion calibration signal of the previous frame, so that the distortion correction may be performed in real time. The method is not affected by the changing scene, the windshield, the optical path, and the like, and the acquisition optical path of the standard plate distortion image is the same as or partially the same to the optical path of receiving the image by the human eyes, so the distortion degree obtained is more accurate. In addition, through real-time acquisition, even if the driver adjusts the position, the distortion degree may be feedback in real time, and then the distortion degree may be adjusted, so that the output correction image is more accurate.

An in-vehicle system including the distortion correction head-up display system hereinabove is further provided in some embodiments of the present disclosure.

According to the distortion calibration glasses, the distortion correction head-up display device and system, the image display distortion correction method and the in-vehicle system, by respectively generating two correction images for the left eye and the right eye, it is able to solve the distortion accumulation of one eye caused by the single correction image which failing to balance both eyes, thereby improving the correction effect and accuracy of the distortion. In addition, by the polarization control, the two correction images can be entered into the corresponding eyes respectively in a time-division manner, so the generated correction images may not be affected by each other. The standard plate is arranged in the glasses, therefore the optical path of the receiving standard distortion image thereof is the same or substantially the same as the optical path of the image from the head-up display device into the human eye, thereby avoiding the influence of different optical paths. In addition, the calibration signal light is transmitted in real time, and the correction image is obtained according to the previous distortion calibration signal, so even if the user or the driver adjusts position, steering or other windshield, etc., and then causes the distortion, the accuracy of the distortion degree will not be affected.

The above are merely some embodiments of the present disclosure. A person skilled in the art may make further modifications and improvements without departing from the principle of the present disclosure, and these modifications and improvements shall also fall within the scope of the present disclosure.

What is claimed is:

1. A distortion correction head-up display system, comprising a head-up display device and a distortion calibration glasses, wherein the distortion calibration glasses comprises a first lens, a second lens and a correction structure, wherein
the correction structure comprises a first standard plate and a first polarizer having a first polarization direction corresponding to the first lens, and a second standard plate and a second polarizer having a second polarization direction corresponding to the second lens, the first polarized direction is perpendicular to the second polarized direction;
the head-up display device comprises an image generation circuit, an optical path circuit, and a control circuit, wherein
the control circuit is configured to generate a first distortion calibration signal and a second distortion calibration signal respectively based on a first distortion degree and a second distortion degree which are predetermined or acquired through a preprocessing;
the image generation circuit is configured to receive the first distortion calibration signal and generate a first correction image subjected to a distortion correction and receive the second distortion calibration signal and generate a second correction image subjected to a distortion correction;
the optical path circuit comprises a third polarizer, wherein the third polarizer is configured to adjust a polarization direction to a first polarization direction or a second polarization direction based on a predetermined condition, to enable the head-up display device to output light of the first correction image polarized at the first polarization direction or light of the second correction image polarized at the second polarization direction.

2. The system according to claim 1, wherein the third polarizer is configured to adjust the polarization direction to the first polarization direction and the second polarization direction alternately at a first predetermined time interval, to generate the first correction image and the second correction image alternately at the first predetermined time interval.

3. The system according to claim 1, wherein the correction structure comprises a first standard plate corresponding to the first lens and a second standard plate corresponding to the second lens;
wherein the image generation circuit is further configured to generate calibration signal light, or the device further comprises a light source configured to emit calibration signal light;
wherein the image generation circuit or the light source is configured to transmit the calibration signal light to the first standard plate and the second standard plate, to obtain a first distortion image of the first standard plate and a second distortion image of the second standard plate; and
wherein the control circuit is configured to generate the first distortion calibration signal based on the first distortion image and the original image of the first standard plate and generate the second distortion calibration signal based on the second distortion image and the original image of the second standard plate, and the image generation circuit is configured to generate the first correction image and second correction image respectively based on the first distortion calibration signal and the second distortion calibration signal.

4. The system according to claim 3, wherein the calibration signal light and the first correction image or the second correction image are generated alternately at a second predetermined time interval; and/or
the first correction image and the second correction image are generated alternately at the second time interval.

5. An in-vehicle system comprising the distortion correction head-up display system according to claim 1.

6. The distortion correction head-up display system according to claim 1, wherein the correction structure comprises a first standard plate and a second standard plate;
the first standard plate is configured to enable the head-up display device to generate a first correction image after receiving a first distortion image of the first standard plate and based on a first distortion degree of the first standard plate and an image to be displayed, and the second standard plate is configured to enable the head-up display device to generate a second correction image after receiving a second distortion image of the second standard plate and based on a second distortion degree of the second standard plate and the image to be displayed.

7. The distortion correction head-up display system according to claim 6, wherein the first distortion degree is determined based on an original image and the first distortion image of the first standard plate, and the second distortion degree is determined based on an original image and the second distortion image of the second standard plate.

8. The distortion correction head-up display system according to claim 6, wherein the calibration structure is configured to enable the first correction image and the second correction image to transmit alternately to left and right eyes of a user at a predetermined time interval.

9. The distortion correction head-up display system according to claim 6, further comprising a first dichroic mirror corresponding to the first standard plate and a second dichroic mirror corresponding to the second standard plate;
wherein the first dichroic mirror is configured to enable light emitted by the head- up display device and reflected by the first dichroic mirror to transmit to the first standard plate, and reflect an image reflected by the first standard plate to the head-up display device, wherein the first correction image generated by the head-up display device passes through the first dichroic mirror and transmits to a left eye of a user; and
wherein the second dichroic mirror is configured to enable light emitted by the head-up display device and reflected by the second dichroic mirror to transmit to the second standard plate, and reflect an image reflected by the second standard plate to the head-up display device, wherein the second correction image generated by the head-up display device passes through the second dichroic mirror and transmits to a right eye of the user.

10. The distortion correction head-up display system according to claim 6, wherein original images of the first standard plate and the second standard plate each comprises square structures arranged in an array.

11. The distortion correction head-up display system according to claim 1, further comprising an image acquisition circuit configured to acquire distortion images of original images and output the distortion images to the control circuit, to enable the first and the second distortion calibration signal to have distortion degrees relative to the original images.

12. The distortion correction head-up display system according to claim 11, wherein the optical path circuit further comprises a third dichroic mirror configured to reflect images reflected by the first and the second standard plates to an image acquisition circuit, wherein the images pass through the optical path circuit and form distortion images.

13. An image display distortion correction method using a distortion correction head-up display system, wherein the distortion correction head-up display system comprises a head-up display device and a distortion calibration glasses, wherein the distortion calibration glasses comprises a first lens, a second lens and a correction structure, wherein the correction structure comprises a first standard plate and a first polarizer having a first polarization direction corresponding to the first lens, and a second standard plate and a second polarizer having a second polarization direction corresponding to the second lens, the first polarized direction is perpendicular to the second polarized direction, wherein the head-up display device comprises an image generation circuit, an optical path circuit, and a control circuit, wherein the control circuit is configured to generate a first distortion calibration signal and a second distortion calibration signal respectively based on a first distortion degree and a second distortion degree which are predetermined or acquired through a preprocessing, wherein the image generation circuit is configured to receive the first distortion calibration signal and generate a first correction image subjected to a distortion correction and receive the second distortion calibration signal and generate a second correction image subjected to a distortion correction, and wherein the optical path circuit comprises a third polarizer, wherein the third polarizer is configured to adjust a polarization direction to a first polarization direction or a second polarization direction based on a predetermined condition, to enable the head-up display device to output light of the first correction image polarized at the first polarization direction or light of the second correction image polarized at the second polarization direction;

the image display distortion correction method comprising:
at a first time period:
receiving, by the image generation circuit, a first distortion calibration signal sent by the control circuit, to generate a first correction image subjected to a distortion correction;
adjusting, by the third polarizer, a polarization direction to a first polarization direction, to enable the head-up display device to output light of the first correction image polarized at the first polarization direction; and
transmitting, by the first polarizer, the light of the first correction image polarized at the first polarization direction to a left eye of a user; and
at a second time period,
receiving, by the image generation circuit, a second distortion calibration signal sent by the control circuit, to generate a second correction image subjected to a distortion correction;
adjusting, by the third polarizer, the polarization direction to a second polarization direction, to enable the head-up display device to output light of the second correction image polarized at the second polarization direction; and
transmitting, by the second polarizer, the light of the second correction image polarized at the second polarization direction to a right eye of the user.

14. The method according to claim 13, wherein the distortion correction head-up display device further comprises an image acquisition circuit, wherein
prior to the image generation circuit receiving the first distortion calibration signal from the control circuit, to generate the first correction image subjected to the distortion correction, the method further comprises:
generating calibration signal light by the image acquisition circuit or a light source, to generate a first distortion image of the first standard plate; and
acquiring the first distortion image of the first standard plate and transmitting the first distortion image to the control circuit by the image acquisition circuit, to enable the control circuit to determine a first distortion degree; and
prior to the image generation circuit receiving the second distortion calibration signal from the control circuit, to generate the second correction image subjected to the distortion correction, the method further comprises:

generating calibration signal light by the image acquisition circuit or the light source, to generate a second distortion image of the second standard plate; and acquiring the second distortion image of the second standard plate and transmitting the second distortion image to the control circuit by the image acquisition circuit, to enable the control circuit to determine a second distortion degree.

* * * * *